(12) United States Patent
Yang et al.

(10) Patent No.: US 8,508,850 B2
(45) Date of Patent: Aug. 13, 2013

(54) MULTI-LAYERED LIGHT DIFFUSION PLATE AND LIQUID CRYSTAL DISPLAY DEVICE COMPRISING THE SAME

(75) Inventors: Hyun-Seok Yang, Daejeon (KR); Bong-Keun Lee, Daejeon (KR); Seo-Hwa Kim, Daejeon (KR); Jae-Chan Park, Daejeon (KR); Ju-Hwa Lee, Gyeonggi-Do (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 12/084,223

(22) PCT Filed: Apr. 13, 2007

(86) PCT No.: PCT/KR2007/001790
§ 371 (c)(1),
(2), (4) Date: Apr. 28, 2008

(87) PCT Pub. No.: WO2007/001790
PCT Pub. Date: Dec. 6, 2007

(65) Prior Publication Data
US 2009/0161221 A1    Jun. 25, 2009

(30) Foreign Application Priority Data
May 30, 2006   (KR) .................... 10-2006-0048679

(51) Int. Cl.
*G02B 13/20* (2006.01)
*G02B 5/02* (2006.01)

(52) U.S. Cl.
CPC .............. *G02B 13/20* (2013.01); *G02B 5/0278* (2013.01)

USPC .................................. 359/599; 359/707

(58) Field of Classification Search
USPC .................................. 359/599, 707
See application file for complete search history.

(56) References Cited

U.S. PATENT DOCUMENTS

| | | | | |
|---|---|---|---|---|
| 5,196,960 | A * | 3/1993 | Matsuzaki et al. | 359/453 |
| 5,900,309 | A * | 5/1999 | Kitamura et al. | 428/212 |
| 6,327,088 | B1 * | 12/2001 | Iwata et al. | 359/599 |
| 6,517,914 | B1 | 2/2003 | Hiraishi | |
| 6,560,023 | B2 * | 5/2003 | Kashima et al. | 359/599 |
| 6,577,358 | B1 * | 6/2003 | Arakawa et al. | 349/57 |
| 6,723,392 | B1 | 4/2004 | Jinnai | |
| 6,741,307 | B2 * | 5/2004 | Matsunaga et al. | 349/112 |

(Continued)

FOREIGN PATENT DOCUMENTS

| | | |
|---|---|---|
| JP | 04-275501 A | 10/1992 |
| JP | 06-059108 A | 3/1994 |

(Continued)

OTHER PUBLICATIONS

European Search Report EP 07745953, dated Jul. 19, 2011.

*Primary Examiner* — Thong Nguyen
(74) *Attorney, Agent, or Firm* — Lerner, David, Littenberg, Krumholz & Mentlik, LLP

(57) ABSTRACT

Disclosed herein is a multi-layered light diffusion plate, in which the multi-layered light diffusion plate is manufactured by coextruding a transparent layer comprising an amorphous transparent thermoplastic resin and a light diffusion layer comprising an amorphous transparent thermoplastic resin and transparent particles, so that the manufacturing process thereof is simple and efficient, and which has excellent light transmissivity and light diffusivity, high brightness, and high brightness uniformity, thereby improving viewing angle characteristics, and to a liquid crystal display device comprising the same.

5 Claims, 1 Drawing Sheet

(56) References Cited

U.S. PATENT DOCUMENTS

| | | | |
|---|---|---|---|
| 6,861,121 B2 * | 3/2005 | Matsunaga et al. | 428/141 |
| 6,875,499 B1 * | 4/2005 | De Toffol et al. | 428/212 |
| 6,941,056 B2 * | 9/2005 | Hirota | 385/141 |
| 7,320,823 B2 * | 1/2008 | Kitahara et al. | 428/212 |
| 7,324,177 B2 * | 1/2008 | Kawanishi et al. | 349/112 |
| 2003/0007764 A1 | 1/2003 | Hirota | |
| 2003/0068512 A1 | 4/2003 | Takahashi et al. | |
| 2003/0128313 A1 | 7/2003 | Kaminsky et al. | |
| 2004/0091667 A1 | 5/2004 | Bermel | |
| 2005/0135118 A1 * | 6/2005 | Takata | 362/615 |
| 2006/0114567 A1 * | 6/2006 | Shim et al. | 359/586 |
| 2006/0209526 A1 * | 9/2006 | Miyauchi | 362/29 |
| 2007/0121345 A1 * | 5/2007 | Chang et al. | 362/633 |
| 2007/0159699 A1 * | 7/2007 | Wang et al. | 359/599 |

FOREIGN PATENT DOCUMENTS

| | | |
|---|---|---|
| JP | 06-123802 A | 5/1994 |
| JP | 06-347617 A | 12/1994 |
| JP | 2001-322218 A | 11/2001 |
| KR | 20020048116 A | 6/2002 |
| WO | 2005/012958 A1 | 2/2005 |

* cited by examiner

MULTI-LAYERED LIGHT DIFFUSION PLATE AND LIQUID CRYSTAL DISPLAY DEVICE COMPRISING THE SAME

CROSS-REFERENCE TO RELATED APPLICATION

This application claims the benefit of Korean Patent Application No. 10-2006-0048679 filed on May 30, 2006, the disclosure of which is incorporated herein in its entirety by reference.

BACKGROUND OF THE INVENTION

The present invention relates to a multi-layered light diffusion plate and to a liquid crystal display device comprising the same, and, more particularly, to a multi-layered light diffusion plate, which is manufactured by coextruding a transparent layer, including an amorphous transparent thermoplastic resin, and a light diffusion layer, including an amorphous transparent thermoplastic resin and transparent particles, so that the manufacturing process thereof is simple and efficient, and which has excellent light transmissivity and light diffusivity, high brightness, and high brightness uniformity, thereby improving viewing angle characteristics, and to a liquid crystal display device comprising the same.

Generally, in a liquid crystal display device, such as a monitor or a liquid crystal TV, a light diffusion sheet has been used to form a point light source or a line light source into a surface light source. This light diffusion sheet must have high light diffusivity in order to prevent light sources or internal objects, disposed posterior thereto, from being seen from the exterior and in order to show uniform luminosity, and must have high light transmissivity in order to increase light efficiency, that is, high brightness and low power consumption. Furthermore, this light diffusion sheet is required to have high brightness uniformity in order to secure wide viewing angles.

Light diffusion sheets, which have been developed up to now, areas follows: (1) a light diffusion sheet obtained by extruding a transparent thermoplastic resin into a sheet shape, and then physically forming protruded portions on the surfaces of the sheet (Japanese Unexamined Patent Application Publication No. Hei04-275501); (2) a light diffusion sheet or film obtained by layering a light diffusion layer, formed of a transparent resin including particles, on a transparent base film, such as a polyester resin (Japanese Unexamined Patent Application Publication No. Hei06-059108); (3) a light diffusion sheet obtained by mixing inorganic particles in a transparent resin to form a mixture, and then forming the mixture into a sheet having light diffusivity (Japanese Unexamined Patent Application Publication No. Hei06-347617); (4) an oriented polyester film, having excellent light diffusivity, comprising at least two layers produced through a coextrusion process (Japanese Unexamined Patent Application Publication No. 2001-322218 and Korean Unexamined Patent Application Publication No. 2002-48116); and (5) a light diffusion sheet obtained by mixing beads in a melted transparent resin to form a mixture, and then extruding the mixture (Japanese Unexamined Patent Application Publication No. Hei06-123802).

The light diffusion sheets mentioned above in (1) and (2) are surface light diffusive sheets obtaining light diffusivity by forming protruded portions on the surfaces thereof or layering a light diffusion layer on the surfaces thereof. However, in light diffusion sheets in general, and the light diffusion sheets (1) and (2), in particular, when the light diffusivity is obtained through a surface treatment, there is a strong likelihood that the surfaces of the sheet will be damaged upon treatment. Particularly, the light diffusion sheet (2) that is now generally used in a small-sized liquid crystal display of a notebook computer, etc. has a problem in that it is difficult to form a layered structure, which is required in order to realize a high-performance liquid crystal display device and a multi-functional liquid crystal display device. Further, this light diffusion sheet has a problem in that a light diffusion layer applied on the surface thereof is easily peeled off due to the difference in the thermal expansion rate between the base film and the sheet.

Meanwhile, the light diffusion sheets mentioned above in (3) and (5) have advantages in that sheets are imparted with light diffusivity while the sheets are formed, thereby obtaining a high light diffusivity. However, the light diffusion sheet (3) has disadvantages in that, because inorganic particles are added to impart light diffusivity, light transmissivity is decreased, and therefore, the brightness and mechanical properties are greatly decreased. Further, this sheet also has a problem in that a processing machine becomes worn down when the sheets are processed for a long time. In the light diffusion sheets (4), since a crystalline polyester resin is used to manufacture the sheet, in order to obtain a light diffusion sheet having a desired light diffusivity and total light transmissivity, a process of manufacturing the light diffusion sheet must include the steps of preparing a non-stretched polyester sheet including at least two layers, stretching the non-stretched polyester sheet by a predetermined elongation percentage in a vertical or horizontal direction at a predetermined temperature, and heat-treating the stretched polyester sheet. In this case, when the process of stretching the non-stretched polyester sheet is not performed, transparency and optical characteristics are greatly decreased due to the presence of crystals between polymer chains formed in a process of cooling the sheet. Accordingly, there are disadvantages in that the manufacturing process thereof is complex and the productivity thereof is decreased, because the stretching process is always required in order to secure the transparency and optical characteristics. The light diffusion sheet (5) mentioned above is now most widely used, but has a problem in that it exhibits neither the brightness nor the brightness uniformity sufficient for application to liquid crystal panels having increasingly wide viewing angles, which have been developed recently.

BRIEF SUMMARY OF INVENTION

Accordingly, the present invention has been made in order to solve the above problems occurring in the prior art, and an aspect of the present invention is to provide a multi-layered light diffusion plate, in which the manufacturing process thereof is simple and efficient, and which has excellent light transmissivity and light diffusivity, high brightness, and high brightness uniformity, thereby improving viewing angle characteristics, and to a liquid crystal display device comprising the same.

According to another aspect of the present invention, there is provided a multi-layered light diffusion plate 1 manufactured by coextruding a transparent layer 2, comprising an amorphous transparent thermoplastic resin, and a light diffusion layer 3, comprising an amorphous transparent thermoplastic resin and transparent particles 4, as shown in FIGS. 1 and 2.

DETAILED DESCRIPTION OF THE INVENTION

Figure 1:
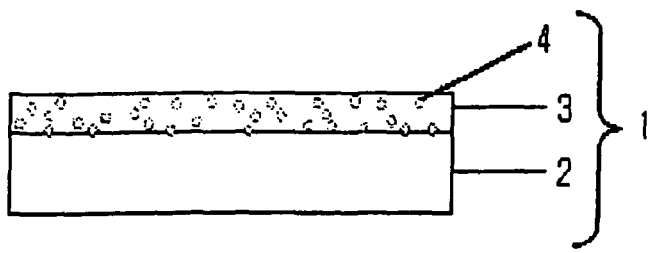
FIG. 1 is a schematic sectional view showing a two-layered light diffusion plate according to an embodiment of the present invention.

In the light diffusion plate 1 of the present invention, the amorphous transparent thermoplastic resin has a total light transmissivity of 70% or more, and preferably 80% or more. Further, in the amorphous transparent thermoplastic resin, unlike a crystalline resin, since crystals are not formed between polymer chains, an additional stretching process for imparting transparency is not required. It is preferred that the amorphous transparent thermoplastic resin be selected from the group consisting of polyalkyl(meth)acrylate, an alkyl (meth)acrylate-styrene copolymer, polycarbonate, polyvinylchloride, a styrene-acrylonitrile copolymer, a styrene-maleic anhydride copolymer, a styrene-maleic anhydride derivative copolymer, a cycloolefin copolymer, polyacrylonitrile, polystyrene, polysulfone, polyethersulfone, polyarylate and a mixture thereof. More particularly, it is preferred that the amorphous transparent thermoplastic resin be selected from the group consisting of polymethyl(meth)acrylate, a methyl(meth)acrylate-styrene copolymer, polycarbonate, polystyrene and a mixture thereof.

Further, in the light diffusion plate 1 of the present invention, the light diffusion layer 3 includes an amorphous transparent thermoplastic resin and transparent particles 4. The above amorphous transparent thermoplastic resin is preferably used as the amorphous transparent thermoplastic resin included in the light diffusion layer 3. Inorganic particles, organic particles or a mixture thereof are used as the transparent particles. Preferably, organic particles are used as the transparent particles 4. It is preferred that the organic particles be produced using one or more selected from the group consisting of a polymethyl(meth)acrylate resin, a methyl(meth) acrylate-styrene copolymer resin, a polystyrene resin and a silicon resin. Further, it is preferred that the organic particles be partially cross-linked because the shape of the particles is not changed, and is thus maintained as it is. It is preferred that the inorganic particles be one or more selected from the group consisting of calcium carbonate, barium sulfate, titanium oxide, aluminum hydroxide, silica, a glass bead, talc, mica, white carbon, magnesium oxide, and zinc oxide.

Further, it is preferred that the transparent particles 4 have an average particle size of 0.5~50 μm, and more preferably 1.5~20 μm. When the average particle size of the transparent particles is below 0.5 μm, sufficient light diffusivity cannot be obtained, so that overall plane luminescence intensity is decreased and a light source is visible through the light diffusion plate. In contrast, when the average particle size of the transparent particle is above 50 μm, sufficient light diffusivity cannot be obtained, so that plane luminescence intensity is decreased, and light transmissivity and brightness are decreased when a large quantity of transparent particles is added in order to increase the light diffusivity.

Further, in the light diffusion plate 1 of the present invention, preferably, the light diffusion layer 3 includes 80~99.9 parts by weight of an amorphous transparent thermoplastic resin and 0.1~20 parts by weight of transparent particles 4. More preferably, the light diffusion layer includes 90~99.5 parts by weight of an amorphous transparent thermoplastic resin and 0.5~10 parts by weight of transparent particles.

Here, when the amount of transparent particles is below 0.1 parts by weight, light diffusivity is insufficient, so that a rear light source is visible through the light diffusion plate. In contrast, when the amount of the transparent particles is above 20 parts by weight, light transmissivity and brightness are decreased.

Further, in the light diffusion plate 1 of the present invention, the transparent layer 2 or the light diffusion layer 3, if necessary, may further selectively include an additive such as an ultraviolet stabilizer, a fluorescent brightening agent, a impact resistant agent, an anti-electrostatic agent, a heat stabilizer, a flame retardant, a lubricant, dye, or the like, in addition to the above components, within the range that accomplishes the objects and effects of the present invention.

In the light diffusion plate 1 of the present invention, it is preferred that the transparent layer 2 have a thickness of 0.95~3.0 mm. More particularly, it is preferred that the transparent layer have a thickness of 1.5~2.5 mm. When the thickness of the transparent layer is below 0.95 mm, the mechanical properties of the light diffusion plate are deteriorated and thus unsuitable. In contrast, when the thickness of the transparent layer is above 3.0 mm, the light diffusion plate becomes heavy, and it is difficult to make the light diffusion plate thin, and thus unpractical.

In the light diffusion plate 1 of the present invention, it is preferred that the light diffusion layer 3 has a thickness of 50~500 μm. More particularly, it is preferred that the light diffusion layer have a thickness of 100~300 μm. When the thickness of the light diffusion layer is below 50 μm, light diffusivity is insufficient, and light transmissivity and brightness are decreased when the amount of transparent particles is increased in order to supplement the light diffusivity. In contrast, when the thickness of the light diffusion layer is above 500 μm, light transmissivity and brightness are decreased even if light diffusivity is improved, and the light diffusion plate becomes heavy, and it is difficult to make the light diffusion plate thin, and thus unpractical.

The light diffusion plate 1 of the present invention is manufactured by coextruding the transparent layer 2 and the light diffusion layer 3. The apparatuses used in the coextrusion process and the coextrusion conditions are not particularly limited. A commonly known coextrusion apparatus, such as a double coextruder or a triple coextruder, as well as any apparatus which can coextrude a polymer resin sheet or a polymer resin film may used. The coextrusion conditions can also be suitably adjusted depending on the kind of resin and the thickness of each layer used in commonly known coextrusion conditions. In a method of manufacturing a multi-layered light diffusion plate according to an embodiment of the present invention, the method includes the steps of mixing 80~99.9% by weight of the above amorphous transparent thermoplastic resin with 0.1~20% by weight of the above transparent particles using a Henschel mixer to form a mixture, extruding the mixture using an extruder to prepare a pellet type resin composition for a light diffusion layer, and melting and coextruding the pellet type resin composition for a light diffusion layer and the amorphous transparent thermoplastic resin for a transparent layer using a coextruder provided with a T-die to obtain a two-layered light diffusion plate or a three-layered light diffusion plate. In this case, if necessary, an additive may be further added at the time of preparing the resin composition of each layer or at the time of coextruding the resin composition. Further, the thickness of each layer can be adjusted by controlling the screw rotation speed of an extruder and thus changing the discharge amount of the extruder.

It is preferred that the multi-layered light diffusion plate of the present invention be a two-layered structure or a three-layered structure. Here, when the multi-layered light diffusion plate 1 is a three-layered structure, it is preferred that an intermediate layer thereof be a transparent layer 2, an uppermost layer thereof be a light diffusion layer 3, and a lowermost layer thereof be a light diffusion layer 3. Further, the multi-layered light diffusion plate of the present invention has a total light transmissivity of 60% or more, preferably 70% or more, and, more preferably 80% or more.

Meanwhile, according to another aspect of the present invention, there is provided a liquid crystal device including the multi-layered light diffusion plate of the present invention.

According to the present invention, there can be realized a multi-layered light diffusion plate, in which the manufacturing process thereof is simple and efficient because no additional stretching process is performed, and which has excellent light transmissivity and light diffusivity, high brightness, and high brightness uniformity, thereby improving viewing angle characteristics, and a liquid crystal display including a direct backlight unit including the light diffusion plate.

Figure 2:
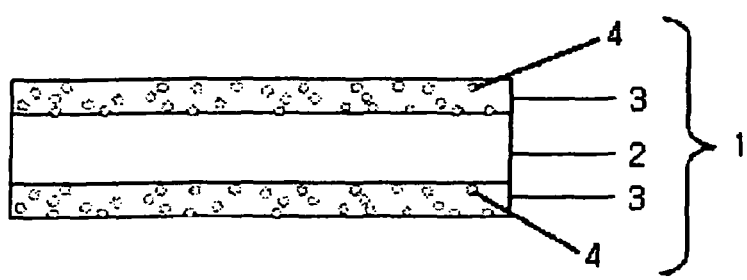
FIG. 2 is a schematic sectional view showing a three-layered light diffusion plate according to another embodiment of the present invention.

As stated above, FIG. 1 is a schematic sectional view showing a two-layered light diffusion plate according to an embodiment and FIG. 2 is a schematic sectional view showing a three-layered light diffusion plate according to another embodiment. Also as shown in FIGS. 1 and 2, the light diffusion plate 1 may include the coextruded transparent layer 2 and light diffusion layer 3. The light diffusion layer 3 may include the transparent particles 4, and, as illustrated, the transparent layer 2 may not include the transparent particles 4. Also as illustrated in the figures, the multi-layered light diffusion plate may have substantially flat surfaces.

Hereinafter, a liquid crystal display device including a direct backlight unit including the multi-layered light diffusion plate of the present invention will be described in detail with reference to the accompanying drawings.

Reference should now be made to the drawings, in which the same reference numerals are used throughout the different drawings to designate the same or similar components.

Figure 4:
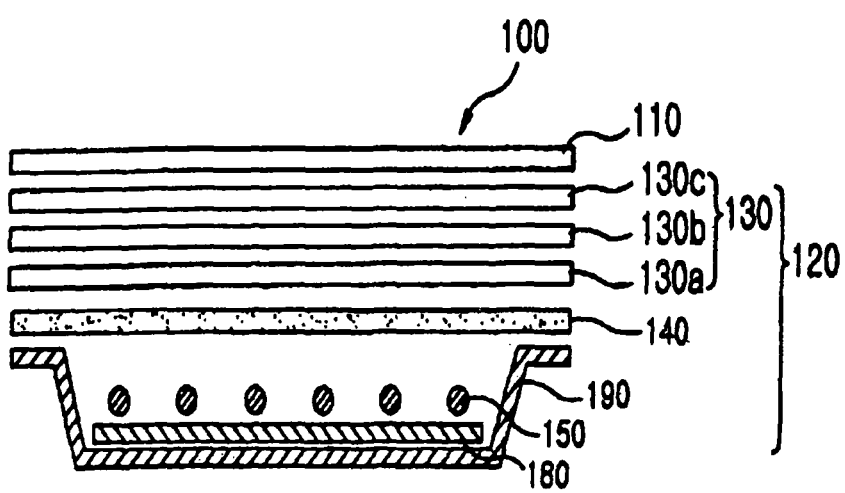
FIG. 4 is a schematic sectional view showing a liquid crystal display device according to the present invention.

FIG. 4 is a schematic sectional view showing a liquid crystal display device 100 according to an embodiment of the present invention.

A liquid crystal display device 100 includes a liquid crystal panel 110, which displays an image according to driving signals and data signals applied from the outside, and a backlight unit 120 arranged behind the liquid crystal panel 110 so as to illuminate the liquid crystal panel 110.

In order to understand the present invention and carry out the present invention, the precise structural characteristics of the liquid crystal panel 110 are not important. A liquid crystal panel having any structure, as long as it is generally used in a liquid crystal display device, may be used in the liquid crystal display device of the present invention.

The backlight unit 120 is placed behind the liquid crystal panel 110, and supplies light, for example, white light, to the liquid crystal panel 110. The backlight unit 120 includes a plurality of light sources 150 supplying light for illuminating the liquid crystal panel 110, a reflective sheet 180, a bottom chassis 190 containing the plurality of light sources 150 and the reflective sheet 180, the light diffusion plate 140 of the present invention, placed over the light sources 150, and an optical sheet 130.

A line light source, such as a Cold Cathode Fluorescent Lamp (CCFL), generating light having a predetermined wavelength, for example, white light, or an External Electrode Fluorescent Lamp (EEFL), is used as the light source 150. However, not only the line light source can be used as the light source 150, and a point light source, such as a Light Emitting Diode (LED), may also be used as the light source 150. In this case, the number of LEDs used as the light source 150 may be suitably selected depending on the size of the liquid crystal panel 110 to be illuminated. Further, the LEDs used as the light source are not limited. One white LED or a combination of three LEDs, generating red light (R), green light (G) and blue light (B), respectively, may be used.

The reflective sheet 180 is placed under the light sources, and improves the efficiency of use of light by reflecting light radiated from the light sources 150 toward the liquid crystal panel 110. The reflective sheet 180 may be manufactured by applying silver (Ag) on a sheet composed of SUS, brass, aluminum or PET, and then coating the sheet with titanium in order to prevent the deformation of the sheet due to the absorption of heat for a long time, even if a very small amount of heat is generated. Further, the reflective sheet 180 may be manufactured by dispersing bubbles for scattering light on a sheet composed of a synthetic resin such as PET.

The light sources 150 and the reflective sheet 180 are contained in the bottom chassis 190.

The light generated from the light sources 150 is transmitted to the multi-layered light diffusion plate 140 of the present invention, which is placed over the light sources 150.

An optical sheet 130 is arranged over the light diffusion plate. The optical sheet 130 includes a diffusion sheet 130a, a prism sheet 130b and a protective sheet 130c. The light having passed through the light diffusion plate 140 is transmitted to a diffusion sheet 130a, and the diffusion sheet 130a serves to make brightness uniform over the entire visible region of the liquid crystal panel 110, and to widen the viewing angle. A prism sheet 130b is placed over the diffusion sheet 130a in order to improve light efficiency and brightness, and serves to supplement the brightness decreased by the diffusion sheet 130a. The prism sheet 130b increases the brightness within the effective viewing angle because it refracts incoming light, which is transmitted from the diffusion sheet 130a at a low incident angle, thus concentrating the light forwardly. A protective sheet 130c is placed over the prism sheet 130b. The protective sheet 130c serves to prevent the prism sheet 130b from being damaged, and to re-widen the viewing angle, reduced by the prism sheet 130b, within a predetermined range.

In the liquid crystal display device of the present invention, since the light generated from the light sources 150 passes through the multi-layered light diffusion plate 140 of the present invention, the light can enter the light diffusion plate at a wider range of incident angle and can be transmitted toward the liquid crystal panel 110, placed at the front of the multi-layered light diffusion plate 140, thereby providing a higher brightness, compared to the conventional light diffusion plate.

EXAMPLES

A better understanding of the present invention may be obtained through the following examples, which are set forth to illustrate, but are not to be construed as the limit of the present invention.

Examples 1 to 9 and Comparative Examples 1 to 3

A resin and transparent particles shown in Table 1 were put into a Henschel mixer at the ratio shown in Table 1, and were then mixed to form a mixture. Then, the mixture was formed into a pellet type resin composition for a light diffusion layer.

The pellet type resin composition for a light diffusion layer and a resin for a transparent layer shown in Table 1 were melted and coextruded using a coextruder provided with a T die, thereby manufacturing a multi-layered light diffusion plate. (However, in Comparative Examples 1 and 2, the pellet type resin composition for a light diffusion layer was independently extruded alone, thereby manufacturing a single-layered light diffusion plate.)

The thickness of each layer of the manufactured multi-layered light diffusion plate was adjusted by controlling the screw rotation speed of an extruder and thus changing the discharge amount of the extruder, and the results thereof are given in Table 1. Further, the total light transmissivity, light diffusivity, average brightness and brightness uniformity of the manufactured multi-layered light diffusion plate were measured using the following measurement methods, and the results thereof are given in Table 2.

Material Property Measurement Methods (1) Total Light Transmissivity and Light Diffusivity The total light transmissivity and light diffusivity were measured using a haze transmissometer (trademark name: HR 100, Murakami Color Research Laboratory).

(2) Average Brightness

Figure 3:
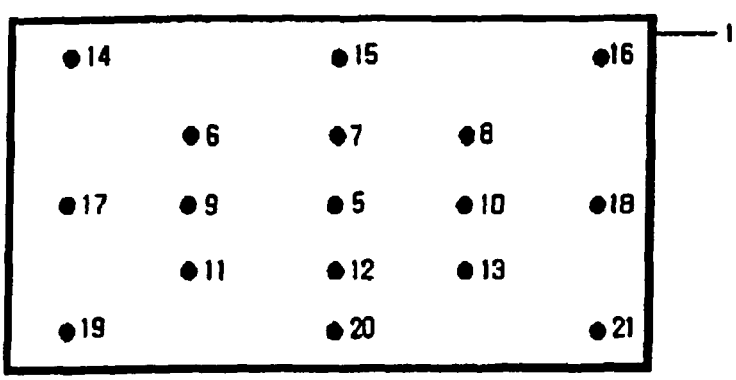
FIG. 3 is a plan view schematically showing an apparatus for evaluating brightness and brightness uniformity.

A sheet was cut to an area of 720 mm×420 mm, and the cut sheet was placed on a 32 inch direct backlight unit. Then, brightness was measured at 17 points (5-21 in FIG. 3) using a BM-7 (an apparatus for evaluating brightness and brightness uniformity, manufactured by TOPCON LTD.), and average brightness was obtained from the measured brightness. The apparatus for evaluating brightness and brightness uniformity was shown in FIG. 3.

(3) Brightness Uniformity

Brightness uniformity was evaluated using the following formula based on maximum brightness and minimum brightness in the measurement results (2). According to the following formula, when the value of the brightness uniformity is 1.00, the brightness uniformity is best. Higher values indicate poor brightness uniformity.

Brightness uniformity=maximum brightness/minimum brightness

TABLE 1

|  | Transparent layer | | Light diffusion layer | | | | |
|---|---|---|---|---|---|---|---|
|  | resin | Thickness (mm) | resin | Resin (wt. %) | Transparent particle (wt. %) | Thickness (μm) | Layer number |
| Example 1 | PMMA | 1.75 | PS | 97.1 | A: 0.9 B: 2.0 | 250 | Two layers |
| Example 2 | PMMA | 1.75 | MS200 | 96.8 | A: 0.9 B: 2.3 | 250 | Two layers |
| Example 3 | PMMA | 1.75 | MS600 | 96.5 | A: 1.2 B: 2.3 | 250 | Two layers |
| Example 4 | PMMA | 1.75 | PMMA | 97.5 | A: 2.5 B: 0 | 250 | Two layers |
| Example 5 | PMMA | 1.75 | PC | 97.1 | A: 0.9 B: 2.0 | 250 | Two layers |
| Example 6 | PS | 1.75 | PS | 97.1 | A: 0.9 B: 2.0 | 250 | Two layers |
| Example 7 | MS200 | 1.75 | MS200 | 96.8 | A: 0.9 B: 2.3 | 250 | Two layers |
| Example 8 | PMMA (intermediate layer) | 1.70 | PS (upper and lower layers) | 97.1 | A: 0.9 B: 2.0 | Upper layer: 150 Lower layer: 150 | Three layers |
| Example 9 | PC | 1.75 | PMMA | 97.5 | A: 2.5 B: 0 | 250 | Two layers |
| Comparative Example 1 | — | — | PMMA | 99.5 | A: 0.5 B: 0 | 2000 | Single layer |
| Comparative Example 2 | — | — | MS200 | 99.5 | A: 0.2 B: 0.3 | 2000 | Single layer |
| Comparative Example 3 | PET | 1.75 | PET | 97.1 | A: 0.9 B: 2.0 | 250 | Two layers |

PMMA: polymethylmethacrylate (LG MMA, EG920)
PS: polystyrene (LG Chem, Ltd., 25SP IDI)
MS200: methylmethacrylate-styrene copolymer (Nippon Steel Corporation)
MS600: methylmethacrylate-styrene copolymer (Nippon Steel Corporation)
PC: polycarbonate (LG DOW polycarbonate, Calibre 300-22)
PET: polyethyleneterephthalate (SK Chemicals, SKYPET BB7755)
Transparent particle A: silicon organic particle (GE Toshiba Silicon, Tospearl 120, average particle size: 2 μm)
Transparent particle B: acrylic organic particle (Nippon Shokubai, MA1002, average particle size: 2.5 μm)

TABLE 2

| | Total light transmissivity (%) | Light diffusivity [haze] (%) | Average brightness (cd/m$^2$) | Brightness uniformity |
|---|---|---|---|---|
| Example 1 | 80.2 | 84.3 | 5412 | 1.36 |
| Example 2 | 80.7 | 84.3 | 5419 | 1.36 |
| Example 3 | 81.1 | 84.2 | 5430 | 1.37 |
| Example 4 | 81.3 | 84.2 | 5423 | 1.37 |
| Example 5 | 79.1 | 84.3 | 5405 | 1.35 |
| Example 6 | 80.0 | 84.3 | 5398 | 1.36 |
| Example 7 | 79.1 | 84.3 | 5385 | 1.36 |
| Example 8 | 78.4 | 84.4 | 5374 | 1.35 |
| Example 9 | 77.8 | 84.3 | 5355 | 1.35 |
| Comparative Example 1 | 69.4 | 84.4 | 5386 | 1.45 |
| Comparative Example 2 | 70.9 | 84.3 | 5380 | 1.47 |
| Comparative Example 3 | 67.4 | 84.4 | 4872 | 1.35 |

As shown in Table 2, the multi-layered light diffusion plates of the present invention in Examples 1 to 9 showed remarkably good total light transmissivity and brightness uniformity, compared to the single layered light diffusion plates, which do not have an additional transparent layer and were not coextruded (Comparative Examples 1 and 2). Further, the multi-layered light diffusion plates of the present invention in Examples 1 to 9 showed remarkably good total light transmissivity and average brightness, compared to the non-stretched light diffusion plate manufactured by coextruding polyethyleneterephthalate, which is a crystalline resin (Comparative Example 3).

According to the present invention, there can be realized a multi-layered light diffusion plate, in which the manufacturing process thereof is simple and efficient because no additional stretching process is performed, and which has excellent light transmissivity and light diffusivity, high brightness, and high brightness uniformity, thereby improving viewing angle characteristics, and a liquid crystal display including a direct backlight unit including the light diffusion plate.

The invention claimed is:

1. A liquid crystal display comprising:
a liquid crystal panel; and
a direct backlight unit that is placed behind the liquid crystal panel, the direct backlight unit comprising a light source, a multi-layered light diffusion plate, and an optical sheet comprising a prism sheet;
wherein the multi-layered light diffusion plate comprises a coextruded transparent layer and a light diffusion layer,
wherein the transparent layer comprises an amorphous transparent thermoplastic resin and has a thickness from 1.5 mm to 2.5 mm,
wherein the light diffusion layer comprises 80 to 99.9 parts by weight of an amorphous transparent thermoplastic resin and 0.1 to 20 parts by weight of transparent particles, and has a thickness from 50 μm to 500 μm,
wherein the multi-layered light diffusion plate has substantially flat surfaces, wherein the liquid crystal panel, the multi-layered light diffusion plate and the light source are installed such that light generated from the light source can pass through the multi-layered light diffusion plate and the optical sheet comprising the prism sheet and be transmitted toward the liquid crystal panel,
wherein:
(a) the transparent particles are organic particles made from one or more selected from the group consisting of a polymethyl(meth)acrylate resin, a methyl(meth)acrylate-styrene copolymer resin, a polystyrene resin and a silicon resin;
(b) the transparent layer does not comprise the transparent particles;
(c) the multi-layered light diffusion plate has a total light transmissivity of 70% or more; and
(d) the multi-layered light diffusion plate is a three-layered structure comprising an intermediate layer formed of the transparent layer, an uppermost layer formed of the light diffusion layer, and a lowermost layer formed of the light diffusion layer.

2. The liquid crystal display of claim 1, wherein the amorphous transparent thermoplastic resin is selected from the group consisting of polyalkyl(meth)acrylate, an alkyl(meth)acrylate-styrene copolymer, polycarbonate, polyvinylchloride, a styrene-acrylonitrile copolymer, a styrene-maleic anhydride copolymer, a styrene-maleic anhydride derivative copolymer, a cycloolefin copolymer, polyacrylonitrile, polystyrene, polysulfone, polyethersulfone, polyarylate and a mixture thereof.

3. The liquid crystal display of claim 1, wherein the amorphous transparent thermoplastic resin is selected from the group consisting of polymethyl(meth)acrylate, a methyl(meth)acrylate-styrene copolymer, polycarbonate, polystyrene and a mixture thereof.

4. The liquid crystal display of claim 1, wherein the organic particles are partially cross-linked.

5. The liquid crystal display of claim 1, wherein the transparent particles have an average particle size of between 0.5 μm and 50 μm.

* * * * *